United States Patent [19]

Das

[11] 3,953,623

[45] Apr. 27, 1976

[54] PROCESS OF SELECTIVELY COATING EARTHENWARE ARTICLES

[76] Inventor: Johannes Cornelis Das, 5, Geerstraat, Bergeyk, Netherlands

[22] Filed: May 28, 1974

[21] Appl. No.: 473,692

Related U.S. Application Data

[63] Continuation-in-part of Ser. No. 206,704, Dec. 10, 1971, abandoned.

[52] U.S. Cl. ................................ 427/189; 118/50; 118/312; 118/642; 427/189; 427/195; 427/345; 427/372; 428/452

[51] Int. Cl.² ...................... B05D 3/02; B05D 1/40; B05D 3/12

[58] Field of Search .................... 117/19, 21, 22, 23, 117/48, 70 R, 123 D; 118/308, 309, 50, 312, 642; 52/309, 311, 515; 427/195, 193, 55, 345, 372, 189; 428/452

[56] References Cited

UNITED STATES PATENTS

| 296,228 | 4/1884 | Schulze-Berge | 118/308 |
|---|---|---|---|
| 1,721,367 | 7/1929 | Barringer | 117/123 D |
| 1,757,528 | 5/1930 | Inman | 117/308 X |
| 2,644,771 | 7/1953 | Kempthorne | 117/70 |
| 2,675,330 | 4/1954 | Schwartz et al. | 117/17 |
| 2,827,397 | 3/1958 | Affleck | 117/123 D X |
| 3,048,499 | 8/1962 | Jellinek | 117/123 D |
| 3,097,959 | 7/1963 | Zachman | 117/48 X |
| 3,140,195 | 7/1964 | Nagel | 117/21 |
| 3,145,502 | 8/1964 | Rubenstein | 52/309 X |
| 3,155,529 | 11/1964 | Paturzo | 117/8 |
| 3,199,923 | 8/1965 | Brooks | 117/21 |
| 3,297,622 | 1/1967 | Grosner et al. | 117/123 D |
| 3,305,812 | 2/1967 | Macchia et al. | 117/21 |
| 3,338,863 | 8/1967 | Haag | 260/37 |
| 3,451,839 | 6/1969 | Cauvin | 117/48 |
| 3,486,921 | 12/1969 | Wallis | 117/19 X |
| 3,488,206 | 1/1970 | Munder et al. | 427/195 |
| 3,809,595 | 5/1974 | Nichols et al. | 117/33 X |

FOREIGN PATENTS OR APPLICATIONS

| 1,025,492 | 4/1966 | United Kingdom | 117/21 |

*Primary Examiner*—Ronald H. Smith
*Assistant Examiner*—Shrive P. Beck
*Attorney, Agent, or Firm*—Kaufman & Kramer

[57] ABSTRACT

Disclosed is a method of selectively coating a surface of a porous earthenware article. The article is heated only on the surface to be coated to which is applied powdered coating material. The coated article is post heated above the melting of the coating material but below the pre-heating temperature in order to produce a smooth coating. By heating below the preheating temperature, bubbles are prevented which may have accured because of the porous nature of the earthenware article. Also disclosed is a suction means for preventing coating material from being applied to undesirable portions of the article.

5 Claims, 4 Drawing Figures

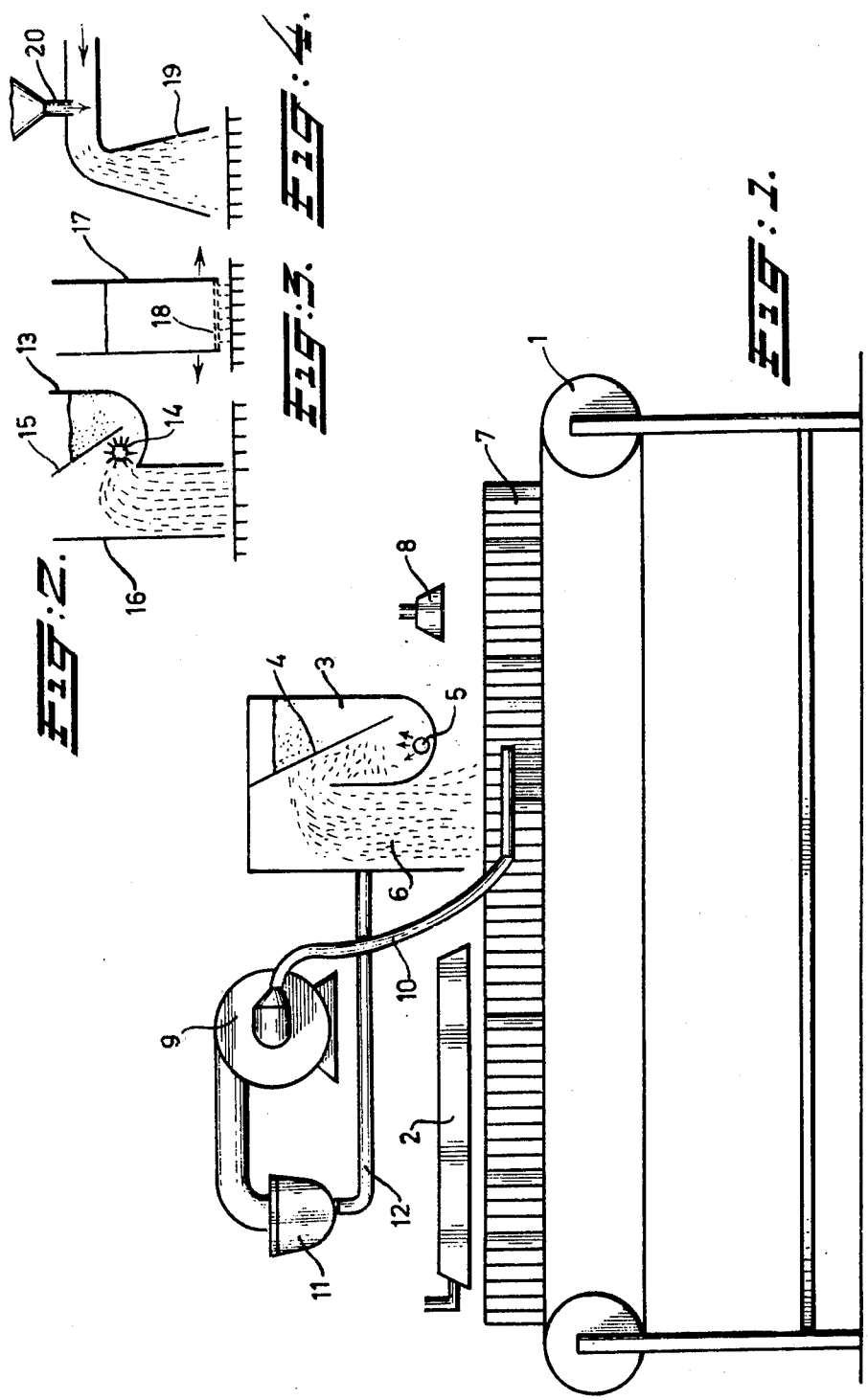

PROCESS OF SELECTIVELY COATING EARTHENWARE ARTICLES

This application is a continuation-in-part of my prior application Ser. No. 206,704 filed Dec. 10, 1971, now abandoned.

This invention relates to a process and an apparatus for coating parts only of earthenware or brick articles having a low heat conductivity.

There are many known coating techniques such as dipping the articles to be coated into a heated fluid or fluidized bed, spraying or brushing the coating material on the articles and subsequently heating them in an oven, or first heating the articles in an oven and then spraying them with the coating material. In the latter case one has also proposed to coat parts only of the articles, by masking the parts of the articles which should not be coated or by directing the coating spray such that it reaches only those parts of the articles which should be coated. However, these known partial coating processes are not easily practicable for coating earthenware or brick articles.

Thus for coating earthenware or brick articles it has been suggested to use a liquid composition but this is disadvantageous as the liquid penetrates into the pores and must be vaporized by heating. It now sometimes occurs that the upper layer of the plastic is damaged by vapours issuing from pores after removal of the liquid from the upper surface coating. In order to prevent these difficulties it is necessary to apply a pore filler substance before applying the plastics which increases the costs.

It is now an object of the invention to provide for a quick, inexpensive and efficient partial coating of earthenware or brick articles without having the above-mentioned difficulties. This aim is attained in that the method comprises the steps of:

a. positioning earthenware articles to be coated with the surface to be coated facing upwardly;
b. heating only the portion of the upwardly facing surface which is to be coated to a temperature above the melting temperature of the coating material without substantial heating the earthenware body below the surface layer;
c. applying particles of the coating material to said heated surface layer;
d. heating the surface layer of the coating to a temperature comprised between the melting point of the plastics and a temperature equal to or below the temperature to which the surface article has been heated in steps;
e. cooling the article after the particulate material has at least partially adhered to said surface layer to form the desired coating, the unheated portion of the surface remaining substantially free of said coating material.

The invention is based on the principle that quick, inexpensive and efficient partial coating of articles can be obtained by locally infrared heating the article such that the coating material adheres only to the part of the article which should be coated, because of the temperature difference between said part and the remainder of the article.

Thus, only the part of the article which should be coated should have a sufficient surface temperature for obtaining adherence of the coating material, whereas the remainder of the object should have a lower temperature. By this step the material adheres only to preselected parts of the article.

It is recommended to heat the upper surface of the plastic layer for providing a smooth coating layer, but the temperature during this heating step must always be under the temperature of heating of the surface to be coated. Otherwise it may occur that gases still present in the pores of the brick after the superficial heating by infrared escape and damage the plastic layer forming bubbles.

An advantageous use of the invention is for providing a smooth coating layer on a single face of bricks or like products wherein according to the invention a group of articles is disposed in a contiguous row and heated exclusively on their top surface up to the bonding temperature of the coating resin, said resin being sprinked from above onto the top surface of said articles only. This process can be performed continuously by continuously moving the row of articles relative to the sprinkling means.

The invention can be carried into effect in an inexpensive and simple manner, if desired on a construction site. When bricks are coated by the process of the invention, the coated product is cheaper than a glazed brick and can be sued for similar purposes.

When applying the invention the earthenware products such as bricks or tiles, it is easy to quickly heat a thin surface layer of parts only of said products to a bonding temperature, which is maintained just long enough for obtaining adherence of the coating material and which cools rather quickly so that the coating solidifies quickly and there is no danger that the coating runs off the sides or that the remainder of the object reaches a temperature at which coating material can adhere to it. Earthenware products moreover have a sufficiently rough surface for obtaining a good bond of the coating material so that there is no necessity for a preroughening operation.

The invention will now be elucidated with reference to the accompanying drawing.

FIG. 1 is a schematic side view of an apparatus according to the invention;

FIGS. 2, 3 and 4 show variants of the coating applying means.

In the embodiments shown, the apparatus according to the invention comprises a conveyor 1, preferably a continuously driven endless belt. A heat source 2, for instance a gas fired infrared heater, is mounted above the initial part of the upper run of the conveyor 1. A coating applying means is mounted adjacent the heat source 2 in the direction of movement of the conveyor 1. According to FIG. 1, the coating applying means or sprinkler comprises a container 3 subdivided by an inclined baffle 4 under which is mounted a finely perforated tube 5 in the lower part of the container 3 The part of the top of the container 3 to the right of the baffle 4 is open for refilling the synthetic resin powder used as coating material, whereas the upper end of the left side wall of the container 3 is situated at a substantial distance below the baffle 4 for connecting the container with a downwardly directed chute 6 mounted to the left side of the container. The chute 6 ends at a small spacing over a row of articles such as bricks 7 aligned on the conveyor 1. If desired, a cooling device or a post-heating device 8 may be mounted over the end part of the upper run of the conveyor 1. A blower 9 is connected to a pair of suction pipes 10, the inlets of which extend at both lateral sides of the row of articles under the chute 6. The air sucked in by the blower 9 is discharged via a filter 11 and a pipe 12 into the tube 5 extending at the bottom of the container 3.

The synthetic resin powder in the container 3 under the baffle 4 is fluidized by the air discharged via the fine perforations of the tube 5 and the fluidized powder passes upwardly through the left part of the container and then downwardly through the chute 6 and is sprinkled on the moving row of bricks 7 or the like. The upper surfaces of the bricks in this row have been heated by the heat source 2 to a temperature above the melting or sintering temperature of the synthetic resin powder so that the powder when contacting the bricks melts or sinters to a smooth layer on the top surface of the bricks 7. The upper surface should be heated to a temperature of at least 30° C above the melting point of the synthetic resin powder. Thus, for a polyvinyl chloride powder melting at about 140° C the surface is preheated to a temperature of about 180° C whereafter the mass is heated to 160° C. At the lateral sides of the row of bricks, the powder is sucked off with the air into the pipe 10 and this powder is filtered out in the filter 11 and can be used for refilling the container 3. Since only a thin layer of the top surface of the bricks in the row has been heated on passing under the heat source 2, this layer will cool rapidly, and this process can easily be controlled so that immediately after passing the container 3 the layer of synthetic resin on top of the bricks will harden or cure to a smooth top surface coating of the bricks. Thus, no coating material will adhere to the sides of the bricks. The smoothness of the top surface coating is obtained by quickly reheating said coating under the post-heater 8, but during the reheating step the temperature must be lower than the temperature of preheating of the surface to be coated.

Instead of the sprinkler according to FIG. 1, other coating applying means can be used, for instance such as shown in FIG. 2, in which a container 13 of a general shape corresponding somewhat to the container 3 comprises a rotary brush 14 between its bottom and an inclined baffle 15, for throwing the synthetic resin powder into the chute 16. FIG. 3 shows another coating applying means comprising a container 17 filled with synthetic resin powder, which container is set into vibratory motion for discharging the powder through its bottom wall which is formed by a finely perforated plate 18. FIG. 4 shows a coating applying means comprising a sprinkler mouth 19 through which air is discharged into which synthetic resin powder is injected via a lateral nozzle 20. Many other types of coating applying means can be used, the only important consideration being that the coating material is evenly applied to the heated surface part of the articles to be coated.

A high quality coating material is a cellulose acetobutyrate sintering powder since it provides an impactproof smooth coating. When using this type of powder the bricks should be heated to about 250° C and should be cooled to below 180° C immediately after leaving the sprinkling area. In the area between the heat source 2 and the sprinkler 3 – 6 a thermostat may be installed for controlling the speed of the conveyor 1. The apparatus may be built on a mobile frame for transport to a construction site.

More particularly the surface of the bricks is heated to at least 30° C above the melting point of the powdered plastic composition but the post-heating of the powdered plastic composition should be effected at a temperature which is less than 30° C above the melting point of the plastic material.

The invention can also be used for other articles than bricks or tiles, for instance for concrete slabs, sand lime bricks or asbest cement articles. Suitable coating materials are cellulose and PVC powders, polyethylene, nylon, poly(methyl acrylate) and epoxy and ceramic powders. All thermoplastic and thermoharding substances suitable for forming coatings can be processed according to the invention.

What I claim is:

1. A process for coating a desired portion of the surface of earthenware articles having a porous surface comprising the steps of:
   a. Positioning earthenware articles to be coated with a particulate coating material with the surface to be coated facing upwardly;
   b. Heating only the portion of the upwardly facing surface which is to be coated to a temperature above the melting temperature of the coating material without substantial heating of the earthenware articles below the surface layer;
   c. Applying particles of the coating material to said heated surface layer thereby forming a continous layer of coating thereon;
   d. Heating the surface layer of the coating to a temperature between the melting point of the coating material and a temperature equal to or below the temperature to which the surface of the article has been heated in step (B) in order to produce a smooth layer of coating material;
   e. Cooling the article after the particulate coating material has at least partially adhered to the surface layer of the article to form the desired coating thereon, the unheated portion of the surface of the article remaining substantially free of said coating material.

2. A process according to claim 1, wherein the surface of the article is heated to a temperature of at least 30° C. above the melting point of the coating material before applying said coating material.

3. A process according to claim 1, wherein the heating is executed by infrared heating.

4. The process according to claim 1 in which the surface of the earthenware articles are heated to about 250° C, and the coating material applied is cellulose acetobutyrate in particulate form.

5. The process of claim 4 wherein the coated articles are cooled to below 180° C immediately after application of the particulate material.

* * * * *